(12) United States Patent
Herrig (10) Patent No.: US 6,539,203 B1
(45) Date of Patent: Mar. 25, 2003

(54) METHOD FOR DETERMINING CELLULAR RADIO CHANNEL ASSIGNMENTS TO MINIMIZE INTERFERENCE DUE TO INTERMODULATION PRODUCTS

(75) Inventor: Hanz Werner Herrig, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/431,792

(22) Filed: Nov. 2, 1999

(51) Int. Cl.$^7$ ................................................ H04B 15/00
(52) U.S. Cl. ......................... 455/62; 455/450; 455/447
(58) Field of Search ................................ 455/447, 450, 455/62, 452, 464, 446, 448, 513, 509, 453, 501, 560, 561, 63, 422; 370/431, 57, 76, 118, 69.1

(56) References Cited

U.S. PATENT DOCUMENTS

| | | | | |
|---|---|---|---|---|
| 5,295,138 A | * | 3/1994 | Greenberg et al. | 370/57 |
| 5,606,286 A | | 2/1997 | Bains | 330/149 |
| 6,085,093 A | * | 7/2000 | Vasudevan et al. | 455/447 |
| 6,181,684 B1 | * | 1/2001 | Turcotte et al. | 370/332 |
| 6,223,041 B1 | * | 4/2001 | Egner et al. | 455/452 |
| 6,230,016 B1 | * | 5/2001 | Benveniste | 455/450 |
| 6,289,202 B1 | * | 9/2001 | Kikuchi | 455/62 |

OTHER PUBLICATIONS

Chen et al., Frequency planning for nonlinear distortion . . . Jul. 1991, vol. 27, No. 14, Electronic Letter.*
Jung et al., Random spacing channel assignment to reduce nonlinear . . . Sep. 1999, IEEE 0018–9545/99.*
R. S. Carson, *Radio Communications Concepts: Analog*, John Wiley & Sons, 1990, pp. 94–99.
N. J. Boucher, *The Cellular Radio Handbook*, Quantum Publishing, 1995, p. 100, 116–118.
W. C. Y. Lee, *Mobile Cellular Telecommunications Systems*, McGraw–Hill Book Company, 1989, pp. 50–59, 231–232.
H. Jung et al., "Random Spacing Channel Assignment To Reduce The Nonlinear Intermodulation Distortion In Cellular Mobile Communications", *IEEE Transactions On Vehicular Technology*, vol. 48, No. 5, Sep. 1999, pp. 1666–1675.

* cited by examiner

*Primary Examiner*—Thanh Cong Le
*Assistant Examiner*—Charles Chow (57) ABSTRACT

A method is presented for reducing the frequency reuse factor by reducing the effects of intermodulation products in a cellular radio system. The cellular radio system constructs and stores modified channel sets that have a reduced measure of homogeneity. The cellular radio system selects a channel number from the appropriate modified channel set in order to support a call. This invention reduces radio interference, thus improving the quality of service and increasing the call capacity of the cellular radio system.

12 Claims, 9 Drawing Sheets

METHOD FOR DETERMINING CELLULAR RADIO CHANNEL ASSIGNMENTS TO MINIMIZE INTERFERENCE DUE TO INTERMODULATION PRODUCTS

FIELD OF THE INVENTION

This invention relates to reducing the frequency reuse factor in a cellular radio system. In particular, intermodulation interference is reduced by choosing channel numbers with a given channel set.

BACKGROUND OF THE INVENTION

Cellular radio service is expanding at an explosive rate and will be ubiquitous in the near future. Thus, it is important that the radio spectrum be used to provide service for more customers with little or no extra cost to the service provider. In cellular radio service, a predetermined radio frequency spectrum is allocated to carry the communication between a user's cellular telephone and the service provider's base station (the gateway into the cellular switching network.) The spectrum is divided into frequency channels, commonly referred to as "channel numbers," and are reused by base stations within a service provider's area. The greater the reuse of frequency channels, the greater the number of cellular radio subscribers that can be simultaneously served. However, one frequency channel cannot be used by two adjacent base stations because each will interfere with one another. While reusing frequency channels more often increases the frequency spectrum efficiency, it also increases the resulting interference. Thus, one skilled in the art balances each factor against the other in order to achieve a compromise.

Radio technology has long recognized the problem of intermodulation (IM) products in radio communications systems (including cellular radio systems). The mixing of two sinusoidal signals having different frequencies in a nonlinear system generates IM products that may interfere with other frequency channels, thus degrading signal quality. IM products correspond to the sum and difference frequency components that are attributed to the "heterodyning process." The heterodyning process is discussed in Carson, Ralph S., *Radio Communications Concepts*, John Wiley and Sons, 1990, pp. 94–99. Heterodyning does not occur in a completely linear system because no new frequency components can be created. A linear system is a system that has the property of superposition. Superposition means that the output signal of the system resulting from a plurality of input signals can be determined by adding the individual output signals corresponding to each of the plurality of input signals. If the system is not completely linear, new frequency components are created whenever two or more original frequency components exist.

To illustrate the hetrodyning problem, assume that the original frequency components are $f_1$ and $f_2$. Third-order nonlinear characteristics generate third-order IM products having frequency components of $2f_1-f_2$, $2f_2-f_1$, $f_1+2f_2$, $2f_1+f_2$, $3f_1$, and $3f_2$. The IM products corresponding to differences are of greater concern because these are more difficult to filter than those corresponding to sums. As an example, let $f_1$ equal 871.920 MHz and $f_2$ equal 872.550 MHz. Third-order IM products corresponding to differences are generated at 871.290 MHz ($2f_1-f_2$) and at 873.180 MHz ($2f_2-f_1$). Third-order IM products corresponding to sums are generated at 2617.020 MHz ($f_1+2f_2$), 2616.390 MHz ($2f_1+f_2$), 2615.760 MHz ($3f_1$), and 2617.650 MHz ($3f_2$). Higher-order nonlinear characteristics generate higher-order IM products such as the fifth-order and seventh-order IM products. The nth-order IM products have frequency components of $pf_1-qf_2$ and $pf_2-qf_1$, where $p+q$ equals $n$ and $p$ is greater than $q$. Higher-order IM products have a lesser effect than the third-order IM products because the corresponding signal levels have less amplitude. Even-order IM products are generally ignored because the corresponding frequency components can be filtered. (In the above example, the second-order IM product has a frequency component of $f_1+f_2$, which equals 1744.470 MHz. This frequency is sufficiently removed from the spectrum centered around 850 MHz and thus can be easily filtered.) Third-order IM products are typically responsible for the most adverse effects on other IM products.

The discussion heretofore specified only two frequency components. If more than two frequency components exist, then each possible pair of all frequency components (channel numbers) must be considered, where the collection of channel numbers is commonly called a "channel set" in the art of cellular radio. If the frequency of an IM product is coincident with a channel number of the channel set, then a "hit" occurs. The total effect is determined by adding the individual effects of each pair. For example, the case in which each of two frequency pairs generate a hit on a given frequency will result in more severe effects than the case in which only one frequency pair generates a hit at the given frequency. Moreover, third-order IM products are also generated by the mixing of three signal components (triplets) having frequencies of $f_1$, $f_2$, and $f_3$, respectively. In such cases, third-order IM products having frequency components of $-f_1+f_2+f_3$, $f_1-f_2+f_3$, and $f_1+f_2-f_3$ are the dominant components. Thus, the total effect of third-order IM products is exacerbated by the presence of these components. The subsequent quantitative assessment of third-order IM products includes only the effects of frequency pairs and not frequency triplets.

In a cellular radio system, full duplex operation is supported so that communication from the serving base station to the mobile subscriber unit (commonly associated with the downlink) and from the mobile subscriber unit to the base station (commonly associated with the uplink) can occur concurrently. The frequency of the downlink (base station to mobile subscriber unit) is spaced 45 MHz from the frequency of the uplink (mobile subscriber unit to base station). For a given call, the serving base station allocates a transmitter and a receiver. Similarly, the mobile subscriber unit tunes its transmitter and receiver to the frequencies associated with the allocated base station equipment. A channel number is associated with both a transmitting frequency and a receiving frequency. For example, the channel number 22 in the B band of the AMPS spectrum is 870.660 MHz for the base station's transmit frequency (downlink) and is 825.660 MHz for the base station's receive frequency (uplink). These frequency assignments are the mobile subscriber unit's receive frequency (downlink) and transmit frequency (uplink), respectively.

IM products are generated if nonlinear characteristics exist at the transmitter, receiver, or structures between the mobile subscriber unit and base station. At the base station, multiple transmitted signals, each having a corresponding frequency value, are combined by an RF combiner or power amplifier so that a common antenna can be utilized. Any nonlinear characteristics of the RF combiner, power amplifier, couplers, filters, duplexers, and cables will also cause signals corresponding to IM products to be transmitted by the antenna. These IM products are detrimental to a call if the frequency of one or more of the IM products is the same as a frequency associated with the call. Even if the RF combiner or power amplifier were completely linear, the receiver of the mobile subscriber unit is exposed to multiple signals having different frequencies. One of the signals corresponds to the frequency associated with the call while the other signals are associated with interference (i.e. calls intended for other mobile subscriber units). If the receiver of the mobile subscriber unit has nonlinear characteristics, IM products are generated. The nonlinear characteristics of the receiver are reflected in the third-order intercept point of the receiver. (Carson, Ralph S., *Radio Communications Concepts*, John Wiley and Sons, 1990, 94–99.)

Furthermore, the generation of IM products can be associated with factors external to the base station and mobile subscriber unit. In fact, any nonlinear junction or device encountered by a signal in its path of propagation can generate IM products. (Boucher, Neil J., *The Cellular Radio Handbook*, Quantum Publishing, 1995, p. 100.) Typical nonlinear junctions or devices include bolted tower joints, antenna clamps, tower guy wires, metal fences, chains, and light bulbs. Such factors may be very difficult to identify and to eliminate.

The discussion heretofore addresses the generation of IM products for the downlink (base station to mobile subscriber unit). However, an analogous discussion can be presented for the uplink (mobile subscriber unit to base station). IM products are detected at the base station's receiver if nonlinear characteristics exist somewhere in the uplink path or at the base station's receiver and if a plurality of mobile subscriber units are simultaneously transmitting at different frequencies. Signals associated with these different frequencies can mix at points having nonlinear characteristics to generate IM products.

There are several known approaches to diminish the effects of IM products in a radio system. The first approach is to reduce the nonlinear characteristics of the electronic components such as RF power devices. However, this approach may not be technically possible or economically feasible. A second approach is to cancel IM products by inducing a signal that is inverted with respect to the distortions caused by the nonlinear characteristics of the electronic circuitry. Such an approach is suggested by U.S. Pat. No. 5,606,286 that issued to Burns. This approach requires additional complexity in electronic circuitry. The third approach is to utilize only frequencies, which reduce the occurrences of IM products by a frequency planning procedure. U.S. Pat. No. 5,295,138, issued to Greenberg, et al., and assigned to Northwest Starcon Limited Partnership uses this approach. The '138 patent reduces the effects of IM products within a common communication channel bandwidth by determining carrier frequencies, which are contained in this bandwidth, so that the IM products are reduced. The '138 patent adjusts carrier frequencies, performs measurements of the resulting IM products, and readjusts the carrier frequencies based upon the measurement results. The '138 patent addresses a problem encountered in satellite radio systems in which the assigned frequencies are randomly selected and moved in an iterative process to reduce the effects of IM products. This approach, however, does not address situations in which frequencies are reused as with cellular radio systems.

Moreover, current literature in the field of cellular radio leads away from the present invention. For example, one reference states that the effects of IM products "will not affect channels within the transmitted band design" when considering the RF combiner with respect to the relatively low amplitudes of the IM products that are generated. (Lee, William C. Y., *Mobile Cellular Telecommunications Systems*, McGraw-Hill Book Company, 1989, pp. 231–232.)

Even though interference in a cellular radio system is a well-recognized problem (any increase of interference will degrade the call capacity of the cellular radio system), the sources of this interference may not be well defined. The current art of cellular radio recognizes co-channel and adjacent channel interference as being two sources of interference. Both co-channel and adjacent interference are addressed by the frequency planning practice detailed in a number of references, e.g. Boucher, Neil, J., *The Cellular Radio Handbook*, Quantum Publishing, 1995, pp. 116–118. The current state of the art propounds that regularly spaced channel sets, each channel set containing a plurality of channel numbers, be assigned in a repeated fashion to cell sites within the coverage area of the cellular radio system. This approach to frequency planning for a cellular radio system fails to recognize the effects of IM products as a source of interference. Reducing the interference attributable to IM products reduces the total interference experienced at the mobile subscriber unit and at the base station.

SUMMARY OF THE INVENTION

The problem of reducing the frequency reuse factor by reducing the effects of intermodulation (IM) products in a cellular radio system is solved and a technical advance is achieved. The invention consists of determining a channel set for each antenna sector of each base station and of assigning an appropriate channel number of the channel set to the associated base station equipment and mobile subscriber unit in order to support a cellular call. Channels are chosen so that the measure of homogeneity is reduced, thus reducing interference associated with IM products. Consequently, the total interference is reduced, allowing for a smaller reuse frequency factor and enhancing the call capacity of the cellular radio system. If the call requires a handoff from the serving base station to another base station or from one antenna sector to another antenna sector of the serving base station, the cellular radio system assigns another channel number, as determined by the invention, so that the call can continue by being served by the second base station or by the second antenna sector.

DETAILED DESCRIPTION

Figure 1:
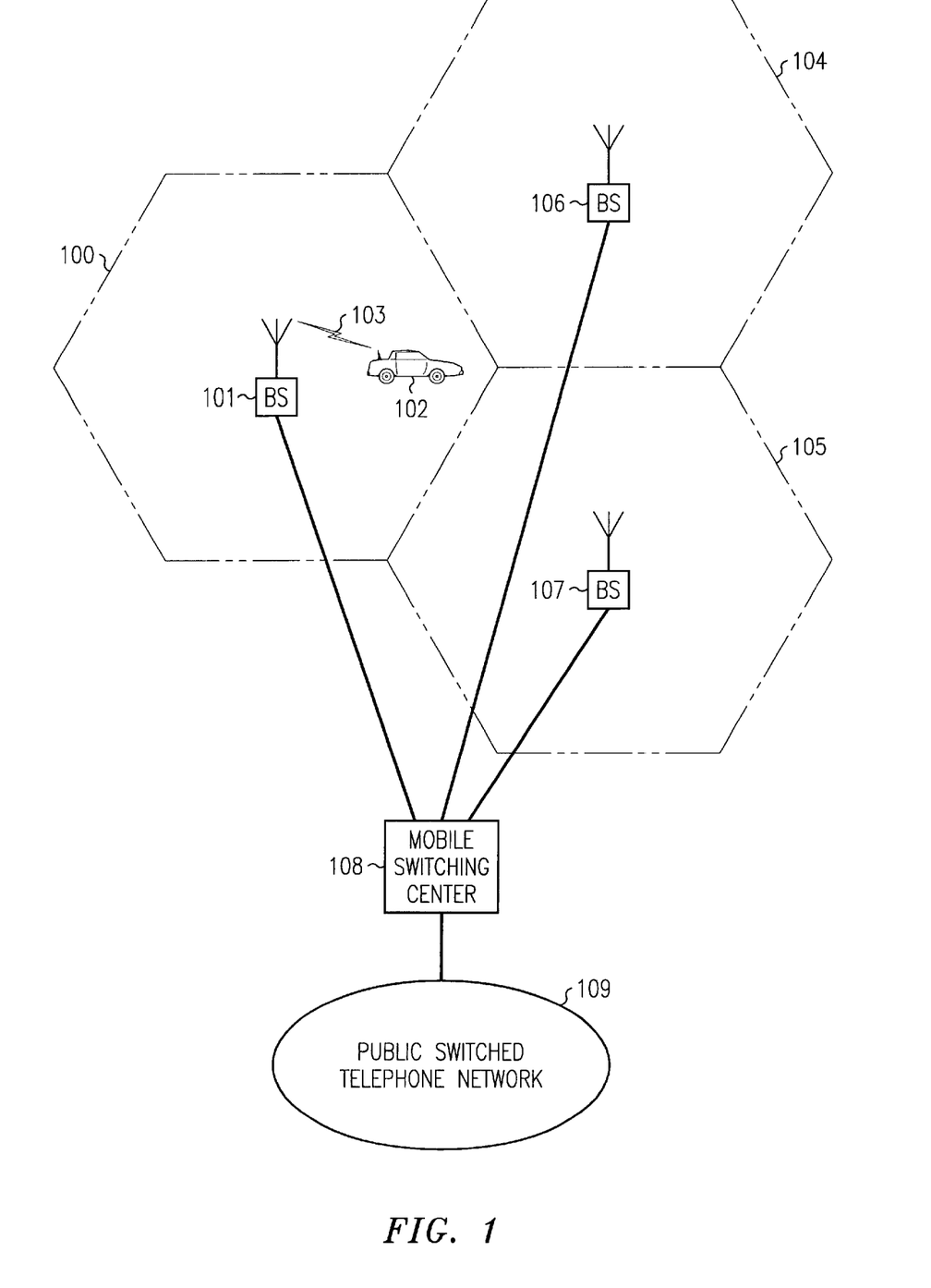
FIG. 1 illustrates a cellular radio system supporting a mobile subscriber unit during a call as supported by prior art.

FIG. 1 illustrates a cellular radio system supporting a mobile subscriber unit 102 during a call. Mobile subscriber unit 102 is located within cell 100 and is served by base station 101. Base station 101 is approximately located at the center of cell 100. Base station 101 communicates with mobile subscriber unit 102 over a radio channel 103, associated with the base station's transmit frequency (mobile station unit's receive frequency) and with the mobile subscriber unit's transmit frequency (base station's receive frequency). Mobile subscriber unit 102 may move outside cell 100 to either cell 104 or cell 105. In such a case, mobile subscriber unit 102 will be served by base station 106 or base station 107, respectively. Base stations 101, 106, and 107 are controlled by mobile switching center 108. In addition, mobile switching center provides a telephony connection between base stations 101, 106, and 107 in order to complete calls between mobile subscriber unit 102 and public switching telephone network (PSTN) 109.

Figure 2:
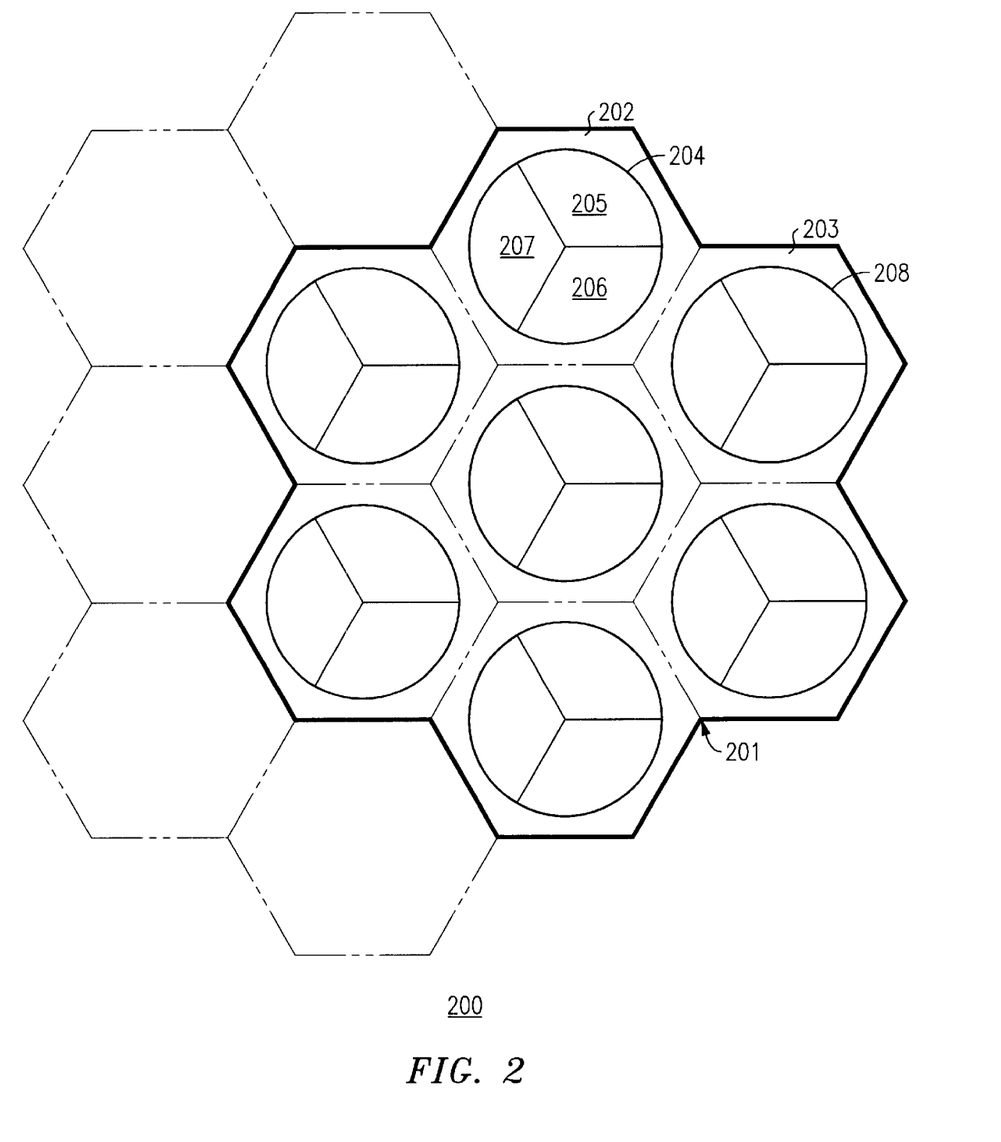
FIG. 2 illustrates a cell cluster for a cellular radio system having a three-sector antenna configuration and a reuse factor of seven as supported by prior art.

FIG. 2 illustrates a cell cluster 201 within a cellular radio system 200 having a three-sector antenna configuration and a frequency reuse factor of seven. The service area of cellular radio system 200 is partitioned into cells such as cell 202 and cell 203. Cell 202 is served by base station 204, and cell 203 is served by base station 208. Cell 202 is configured with three antenna sectors: alpha antenna sector 205, beta antenna sector 206, and gamma antenna sector 207. Each cell cluster consists of seven cells in such a configuration. Because the frequency reuse factor is seven, the frequency spectrum is reused by every cell cluster 201. Each cell requires three channel sets; therefore, a total of twenty-one channel sets are required by cell cluster 201. Other frequency reuse factors can be employed, but a frequency reuse factor is typically seven for a three-sector antenna configuration. For an omnidirectional configuration, a frequency reuse factor of thirteen is typical. In such a configuration, the radio spectrum is repeated every thirteen cells. Because each cell requires one channel set, a total of thirteen channel sets are required by a cell cluster. The cell clusters, or a portion thereof, are repeatedly deployed in order to expand cellular coverage as needed.

The usable frequency spectrum is partitioned into channel sets. Each channel set contains a plurality of channel numbers, each channel number corresponds to both a transmit frequency and a receive frequency. Tables 1, 2, and 3 illustrate an example of the partitioning of a 850 MHz cellular frequency spectrum into channel sets for the A band (limited spectrum). (Boucher, Neil, J., *The Cellular Radio Handbook*, Quantum Publishing, 1995, p. 117.) The frequency assignments, as shown in Tables 1, 2, and 3, are followed in current practice.

TABLE 1

Purely Homogeneous Frequency Sets for Alpha Sector

| Cell 1 | Cell 2 | Cell 3 | Cell 4 | Cell 5 | Cell 6 | Cell 7 |
|---|---|---|---|---|---|---|
| 1 | 2 | 3 | 4 | 5 | 6 | 7 |
| 22 | 23 | 24 | 25 | 26 | 27 | 28 |
| 43 | 44 | 45 | 46 | 47 | 48 | 49 |
| 64 | 65 | 66 | 67 | 68 | 69 | 70 |
| 85 | 86 | 87 | 88 | 89 | 90 | 91 |

TABLE 1-continued

Purely Homogeneous Frequency Sets for Alpha Sector

| Cell 1 | Cell 2 | Cell 3 | Cell 4 | Cell 5 | Cell 6 | Cell 7 |
|---|---|---|---|---|---|---|
| 106 | 107 | 108 | 109 | 110 | 111 | 112 |
| 127 | 128 | 129 | 130 | 131 | 132 | 133 |
| 148 | 149 | 150 | 151 | 152 | 153 | 154 |
| 169 | 170 | 171 | 172 | 173 | 174 | 175 |
| 190 | 191 | 192 | 193 | 194 | 195 | 196 |
| 211 | 212 | 213 | 214 | 215 | 216 | 217 |
| 232 | 233 | 234 | 235 | 236 | 237 | 238 |
| 253 | 254 | 255 | 256 | 257 | 258 | 259 |
| 274 | 275 | 276 | 277 | 278 | 279 | 280 |

TABLE 2

Purely Homogeneous Frequency Sets for Beta Sector

| Cell 1 | Cell 2 | Cell 3 | Cell 4 | Cell 5 | Cell 6 | Cell 7 |
|---|---|---|---|---|---|---|
| 8 | 9 | 10 | 11 | 12 | 13 | 14 |
| 29 | 30 | 31 | 32 | 33 | 34 | 35 |
| 50 | 51 | 52 | 53 | 54 | 55 | 56 |
| 71 | 72 | 73 | 74 | 75 | 76 | 77 |
| 92 | 93 | 94 | 95 | 96 | 97 | 98 |
| 113 | 114 | 115 | 116 | 117 | 118 | 119 |
| 134 | 135 | 136 | 137 | 138 | 139 | 140 |
| 155 | 156 | 157 | 158 | 159 | 160 | 161 |
| 176 | 177 | 178 | 179 | 180 | 181 | 182 |
| 197 | 198 | 199 | 200 | 201 | 202 | 203 |
| 218 | 219 | 220 | 221 | 222 | 223 | 224 |
| 239 | 240 | 241 | 242 | 243 | 244 | 245 |
| 260 | 261 | 262 | 263 | 264 | 265 | 266 |
| 281 | 282 | 283 | 284 | 285 | 286 | 287 |

TABLE 3

Purely Homogeneous Frequency Sets for Gamma Sector

| Cell 1 | Cell 2 | Cell 3 | Cell 4 | Cell 5 | Cell 6 | Cell 7 |
|---|---|---|---|---|---|---|
| 15 | 16 | 17 | 18 | 19 | 20 | 21 |
| 36 | 37 | 38 | 39 | 40 | 41 | 42 |
| 57 | 58 | 59 | 60 | 61 | 62 | 63 |
| 78 | 79 | 80 | 81 | 82 | 83 | 84 |
| 99 | 100 | 101 | 102 | 103 | 104 | 105 |
| 120 | 121 | 122 | 123 | 124 | 125 | 126 |
| 141 | 142 | 143 | 144 | 145 | 146 | 147 |
| 162 | 163 | 164 | 165 | 165 | 166 | 167 |
| 183 | 184 | 185 | 186 | 187 | 188 | 189 |
| 204 | 205 | 206 | 207 | 208 | 209 | 210 |
| 225 | 226 | 227 | 228 | 229 | 230 | 231 |
| 246 | 247 | 248 | 249 | 250 | 251 | 252 |
| 267 | 268 | 269 | 270 | 271 | 272 | 273 |
| 288 | 289 | 290 | 291 | 292 | 293 | 294 |

Tables 1, 2 and 3 illustrate channel sets that are assigned to each cell in a cell corresponding to the alpha, beta, and gamma sectors, respectively for a three-sector antenna configuration and a frequency reuse factor of seven. Each of the channel sets in Tables 1, 2, and 3 has a uniform frequency separation equal to 21 (which is equivalant to 21*30 KHz or 630 KHz) between each adjacent channel numbers within a channel set. Each channel set has a uniform distribution in that each adjacent channel number is separated by 21 or multiples of 21. Each channel such set is referred as a "purely homogeneous channel set." In the context of this discussion, a channel set having this uniform property is referred as a "purely homogeneous channel set" because every entry in the channel set is separated by 21 or multiples of 21. Moreover, several purely homogeneous channel sets can be combined to form another channel set. As an example, consider the B frequency band of the 850 MHz cellular spectrum. The B frequency band is further partitioned into the basic B band (880 MHz to 890 MHz for the base station's transmit frequency and 835 MHz to 845 MHz for the base station's receive frequency) and the B' band (891.5 MHz to 894 MHz for the base station's transmit frequency and 846.5 MHz to 849 MHz for the base station's receive frequency), each of which corresponds to a purely homogeneous subset.

Channels in a homogeneous channel set generates IM products that fall on other channels in the channel set. As known in the art, in each purely homogeneous channel set of Tables 1, 2, and 3 each channel number experiences at least 6 occurrences ("hits") of third-order IM products (of the form $2f_1-f_2$) having the same frequency. As an example, there are 6 hits corresponding to channel number 22 in the first channel set of Table 1 (i.e. 2*43–64, 2*64–106, 2*85–148, 2*106–190, 2*127–232, and 2*148–274). Each hit corresponds to an IM product having an associated transmit frequency and receive frequency. Also, other third-order IM products, such as those attributable to frequency triplets, and higher-order IM products are generated. Each occurrence of an IM product produces interference to a given channel number, thus degrading the quality of communication between the base station and mobile subscriber unit. The frequency reuse factor is important in determining the call capacity of a cellular radio system. For an omindirectional configuration, the size of the channel set associated with a cell is equal to the total number of channel numbers available to the entire cellular system divided by the frequency reuse factor. For a directional configuration, the channel sets associated with the antenna sectors of a cell are determined by equally dividing the channel set that would have been assigned to the cell for an omnidirectional configuration.

The frequency reuse factor is chosen in order to achieve a desired carrier to interference ratio C/I. For an omnidirectional configuration, the frequency reuse factor K can be approximated by:

$$K = \tfrac{1}{3}  (6  C/I)^{(2/\gamma)} \quad (1),$$

where gamma is based upon the terrain environment, also known as the path loss exponent. See reference Lee, William C. Y., *Mobile Cellular Telecommunications Systems*, McGraw-Hill Book Company, 1989, pp. 50–59. (This relationship is applicable both to the uplink and the downlink.) In equation (1), co-channel interference I on the downlink is only associated with interference that is generated by base stations, other than the serving base station, transmitting at the same frequency as the serving base station. Conversely, co-channel interference I on the uplink is only associated with interference that is generated by mobile subscriber units, other than the served mobile subscriber unit, transmitting on the given frequency and located in cells allocated with the same given frequency. However, co-channel interference I in equation (1) does not include the additional interference caused by IM products. As a result, interference I in equation (1) must be adjusted to compensate for the effects of IM products in order to achieve the same quality of service without the effects of IM products. Thus, one must increase C/I to compensate for the additional interference caused by IM products.

As an example, if C/I=19.5 dB without the presence of IM products and gamma=3.5, one determines that the frequency reuse factor K=12 from equation (1). However, if the total interference (co-channel interference plus the effects of IM products) is increased by 2 dB as a result of IM products, one determines that the frequency reuse factor is increased to 15.6. In this case, C/I is increased to 21.5 dB to compensate for the effects of IM products. Since cell site fractions cannot be considered in the frequency reuse factor, one must round up the frequency reuse factor to 16. In this example, the size of the channel set is reduced by approximately 24 percent if the effects of IM products are included. The essence of this example is that the effect of IM products reduces the call capacity of a cellular radio system, assuming that the grade of service is maintained. A similar analysis can be applied to a directional configuration by one skilled in the art.

Figure 3A:
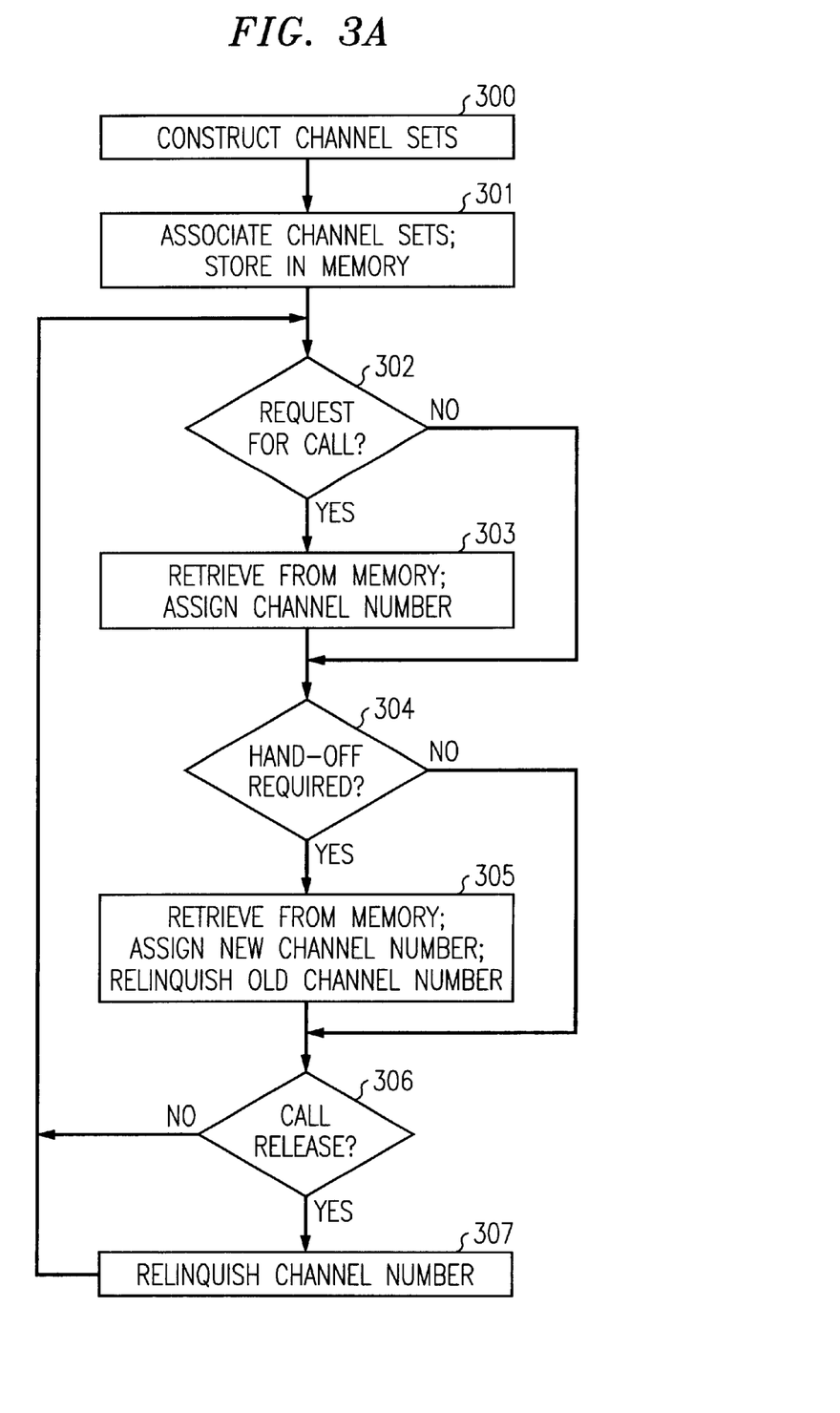
FIG. 3a is a flow diagram showing the logic for implementing the invention.

FIG. 3a is a flow diagram showing the logic for selecting channels for a channel set according to this invention. In step 300, one constructs a collection of channel sets that reduces the measure of homogeneity. Several algorithms that provide a reduction of homogeneity will be described. Channel sets that have a reduced measure of homogeneity are referred to herein as "modified channel sets." In step 301, modified channel sets are associated with the base stations according to the antenna configuration and the frequency reuse factor. A representation of the calculated modified channel sets is stored into a memory device for later retrieval. The memory device is located at an entity of the cellular radio system such as the base station or a mobile switching center that is associated with the base station. In step 302, the cellular radio system determines whether a mobile unit is requesting a call or that there is an incoming call for a mobile subscriber unit. In step 303, the representation of an appropriate modified channel set is retrieved from memory and a channel number is chosen from the modified channel set. The modified channel set is associated with the antenna sector in which the mobile subscriber unit is located when the call is setup. The channel number is allocated to the call. If, during the call, the cellular radio system determines that a handoff is necessary in step 304, the cellular radio system retrieves the representation of an appropriate modified channel set and assigns a new channel number from this modified channel set in step 305, which corresponds to the cell and antenna sector that the mobile subscriber unit has moved to. In such a case, the old channel number is relinquished so that the old channel number can be allocated to a different call. In step 306, the cellular radio systems determines if the call is released, either by the mobile subscriber unit or by the party that was connected to the given mobile subscriber unit during the call. If the call is released, the previously allocated channel number is relinquished in step 307 so that the channel number can be allocated for a different call.

In step 300 in FIG. 3a, an algorithm transforms purely homogeneous sets, such as shown in Tables 1, 2, and 3, into modified channel sets. The purpose of the algorithm, according to this exemplary embodiment of this invention, is to decrease the degree of homogeneity. In general, the less the homogeneity, the greater the reduction of the number of resulting IM products.

Figure 3B:
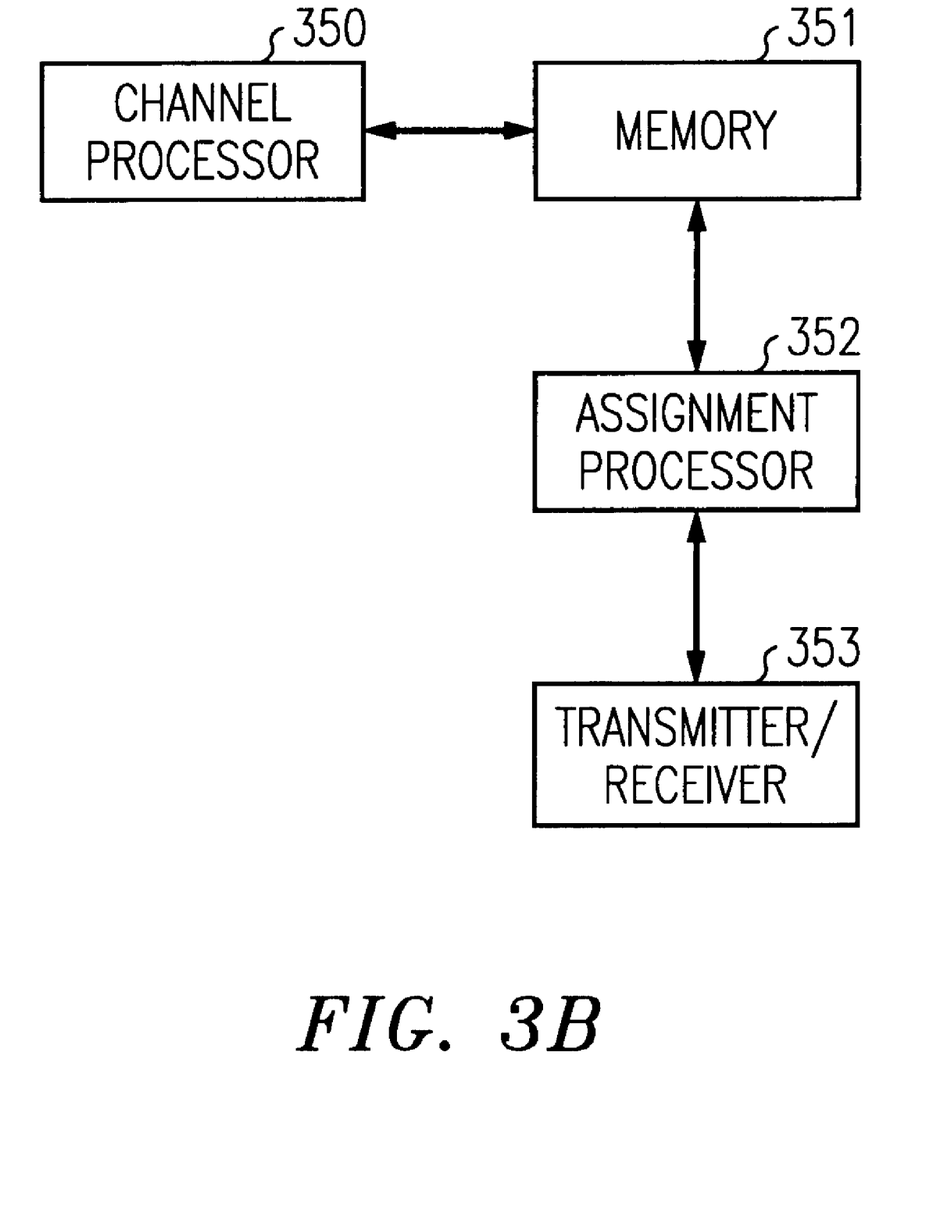
FIG. 3b is a block diagram illustrating an apparatus embodiment in accordance with the present invention.

FIG. 3b shows a block diagram illustrating an apparatus embodiment in accordance with the present invention. Channel processor 350 constructs modified channel sets from purely homogeneous channel sets in accordance with the call flow shown in FIG. 3a. Channel processor 350 can be located at the mobile switching center or base station. Alternatively, channel processor 350 can be separate from the cellular radio system so that calculations are determined at a remote location. The results, as determined by channel processor 350, are stored in memory 351. Memory 351 can be situated at either the mobile switching center or the base station. Assignment processor 352 appropriately selects a channel number from memory 351 in order to set up a call or to handoff a call. Assignment processor 352 instructs transmitter/receiver 353 to tune to the associated radio frequency. Assignment processor 352 can be situated either at the mobile switching center or at the base station. Transmitter/receiver 353 is located at the base station.

Figure 4A:
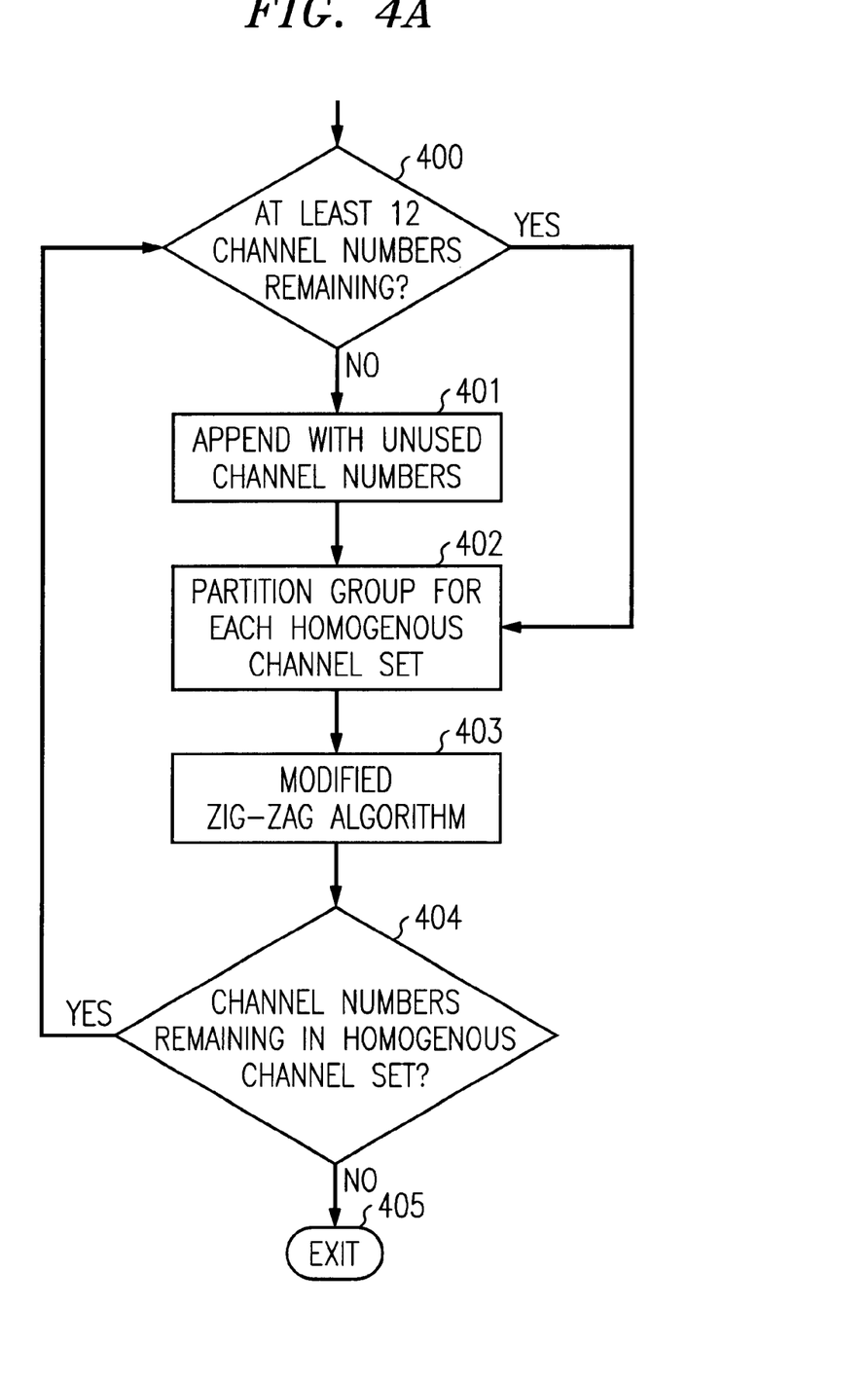
FIG. 4a illustrates partitioning channel sets into groups so that the modified zig-zag algorithm can be applied.
Figure 4B:
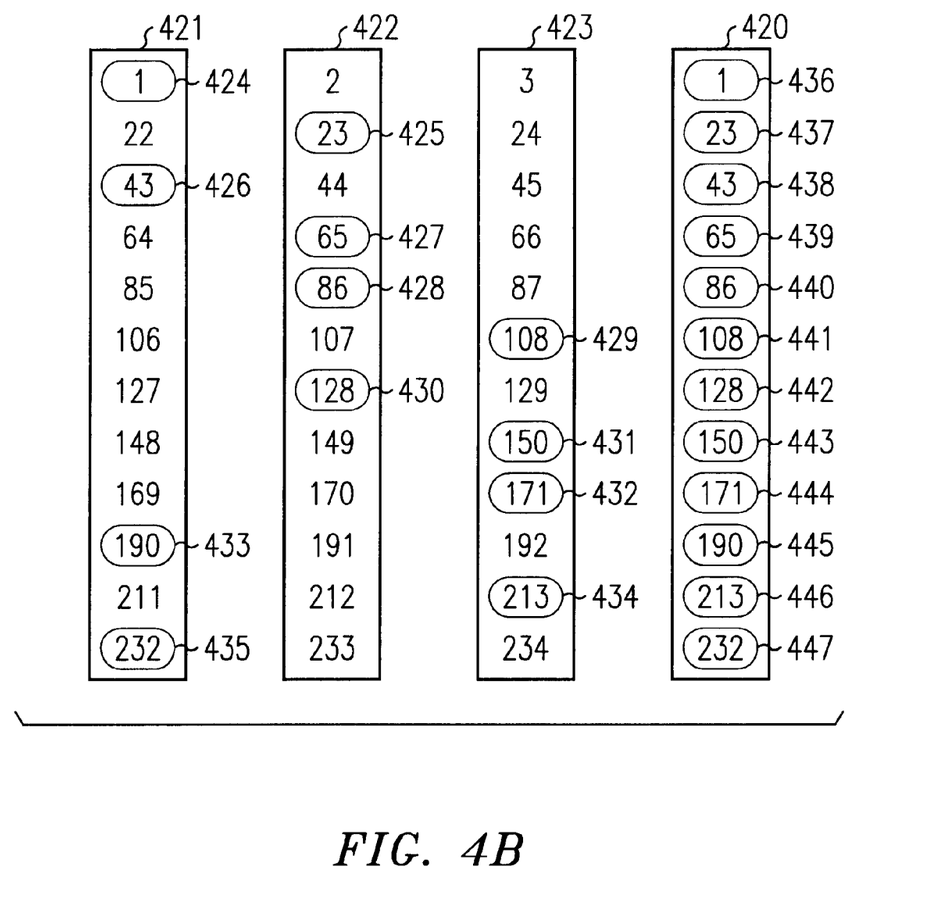
FIG. 4b illustrates an example of applying the modified zig-zag algorithm in order to construct a channel set that reduces IM products.
Figure 4C:
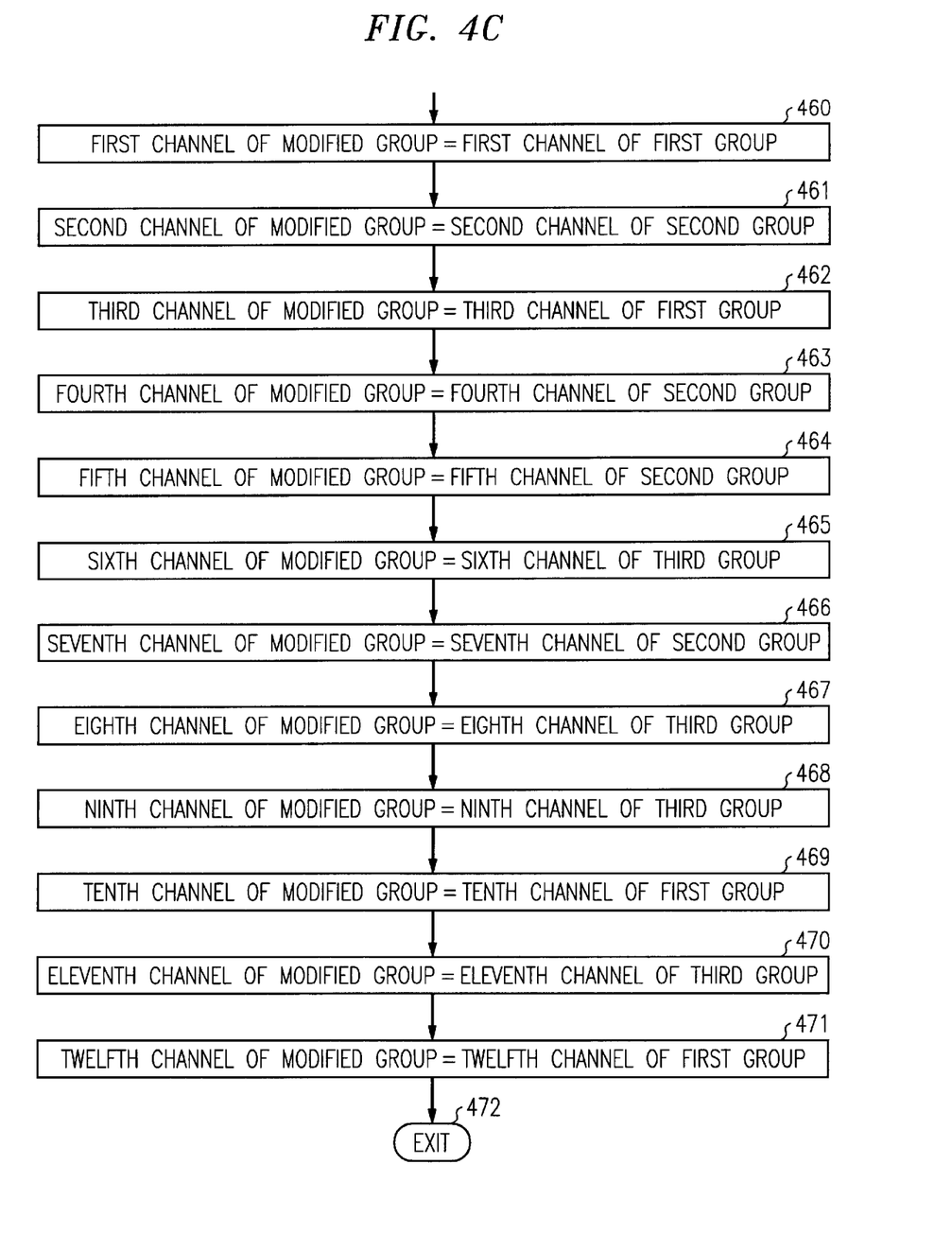
FIG. 4c shows a flow diagram for the modified zig-zag algorithm.

FIGS. 4a, 4b, and 4c illustrate one possible algorithm for constructing channel sets in a cellular radio system, which is called the "modified zig-zag" algorithm. This algorithm, combined with the logic shown in FIG. 3a, presents an exemplary embodiment of the invention. In step 400 of FIG. 4a, it is determined if the number of channel numbers remaining in each of the purely homogenous channel sets is at least 12. (Initially, the number of remaining channel numbers is equal to all of the channel numbers. Also, each channel set has the same number of channel numbers.) If so, step 402 partitions 12 channel numbers of each purely homogeneous channel set into a group for the corresponding purely homogeneous channel set. These channel numbers are removed from subsequent processing if step 400 is repeated. If step 400 determines that there are less than 12 channel numbers remaining in each purely homogeneous channel set, step 401 appends the necessary number of unused channel numbers so that groups can be formed in step 402. An equivalent alternative to appending is to truncate partitioning. Step 403 transforms the groups of the purely homogeneous channel sets into corresponding groups- of the modified channel set. Step 403 corresponds to FIG. 4b, which is described shortly. In step 404, if any channel number remains in each purely homogeneous channel set, step 400 is repeated. Otherwise, the process is completed in step 405.

In FIG. 4b, groups 421, 422, and 423 represent groups of three purely homogeneous channel sets. Each of the purely homogeneous sets is ordered so that channel numbers have progressively larger values. As an example, one can choose preferably three adjacent purely homogeneous channel sets shown in Tables 1, 2, and 3. The modified channel set is derived by processing the three purely homogeneous sets with the modified zig-zag algorithm. FIG. 4b shows a modified group 420, a first group 421, a second group 422, and a third group 423 associated with a modified channel set, a first purely homogeneous channel set, a second purely homogeneous channel set and a third purely homogeneous channel set, respectively. First channel number 436 of modified group 420 is the same as first channel number 424 of first group 421. Second channel number 437 of modified group 420 is equal to second channel number 425 of second group 422. Third channel number 438 of modified group 420 is equal to third channel number 426 of first group 421. Fourth channel number 439 of modified group 420 is equal to fourth channel number 427 of second group 422. Fifth channel number 440 of modified group 420 is equal to fifth channel number 428 of second group 422. Sixth channel number 441 of modified group 420 is equal to sixth channel number 429 of third group 423. Seventh channel number 442 of modified group 420 is equal to seventh channel number 430 of second group 422. Eighth channel number 443 of modified group 420 is equal to eighth channel number 431 of third group 423. Ninth channel number 444 of modified group 420 is equal to ninth channel number 432 of third group 423. Tenth channel number 445 of modified group 420 is equal to tenth channel number 433 of first group 421. Eleventh channel number 446 of modified group 420 is equal to eleventh channel number 434 of third group 423. Twelfth channel number 447 of modified group 420 is equal to twelfth channel number 435 of first group 421. This process is repeated for the remaining groups of the purely homogeneous channel sets.

Applying the modified zig-zag algorithm to the first three purely homogeneous channel sets in Table 1, the number of IM products is greatly reduced. In this example, the first purely homogenous channel set contains channels 1, 22, 43, 64, 85, 106, 127 148, 169, 190, 211, 232, 253, and 274; the second purely homogeneous channel set contains channels 2, 23, 44, 65, 86, 107, 128, 149, 170, 191, 212, 233, 254, and 275; and the third purely homogeneous channel set contains channels 3, 24, 45, 66, 87, 108, 129, 150, 171, 192, 213, 234, 255, and 276. Applying the modified zig-zag algorithm to these purely homogeneous channel sets, the modified channel set contains channels 1, 23, 43, 65, 86, 108, 128, 150, 171, 190, 213, 232, 253, and 275. An analysis indicates that the number of occurrences of third-order IM products (having the form $2f_1-f_2$) that correspond to each channel number of the modified channel set is 0.26 on average. This can be compared to the case of purely homogeneous channel sets in Tables 1, 2 and 3, in which the number of occurrences is at least 6. When constructing modified channel sets, a number of factors must be considered such as a minimum spacing between channel numbers within the modified channel set, adjacent channel interference, and alternate channel interference. These factors are well known to one skilled in the art.

A second and third modified channel sets are constructed in a similar manner by assigning the remaining channels numbers of channel groups 421, 422 and 423 to these modified channel sets. The second purely homogenous channel set is associated with first group 421, the third purely homogeneous channel set is associated with second group 422, and the first purely homogenous channel set is associated with third group 423 when constructing the second modified channel set. Similarly, when constructing the third modified channel set, the third purely homogenous channel set is associated with first group 421, the first purely homogeneous channel set is associated with second group 422, and the second purely homogenous channel set is associated with third group 423.

FIG. 4c shows a flow diagram of the modified zig-zag algorithm and provides an alternative presentation of FIG. 4b. Steps 460, 461, 462, 463, 464, 465, 466, 467, 468, 469, 470, and 471 presents the determination of channel numbers 436, 437, 438, 439, 440, 441, 442, 443, 444, 445, 446, and 447, respectively as shown in FIG. 4b. When all 12 channel numbers of the modified group are determined, the routine in FIG. 4c is exited in step 472. The process in FIG. 4c corresponds to step 403 in FIG. 4a.

The modified zig-zag algorithm is applied to the other purely homogeneous channel sets of Tables 1, 2, and 3 in order to construct a complete collection of modified channel sets. To continue the example, purely homogeneous channel sets Cell 4, Cell 5, and Cell 6 in Table 1 are selected. The process shown in FIG. 4a and 4b are applied in order to construct two additional modified channel sets. Next, purely homogeneous channels sets Cell 7 (Table 1), Cell 1 (Table 2), and Cell 2 (Table 2) are selected. This process is continued until all purely homogeneous channel sets of Tables 1, 2, and 3 are selected.

Utilizing three purely homogeneous channel sets at a time, the modified zig-zag algorithm is amenable to configurations in which the total number of purely homogeneous channel sets is divisible by three. This algorithm can be applied to other configurations in which the total number of purely homogenous channel sets is not divisible by three by utilizing a different number of purely homogeneous channel sets. One skilled in the art will recognize how to apply this algorithm in such cases.

Figure 5:
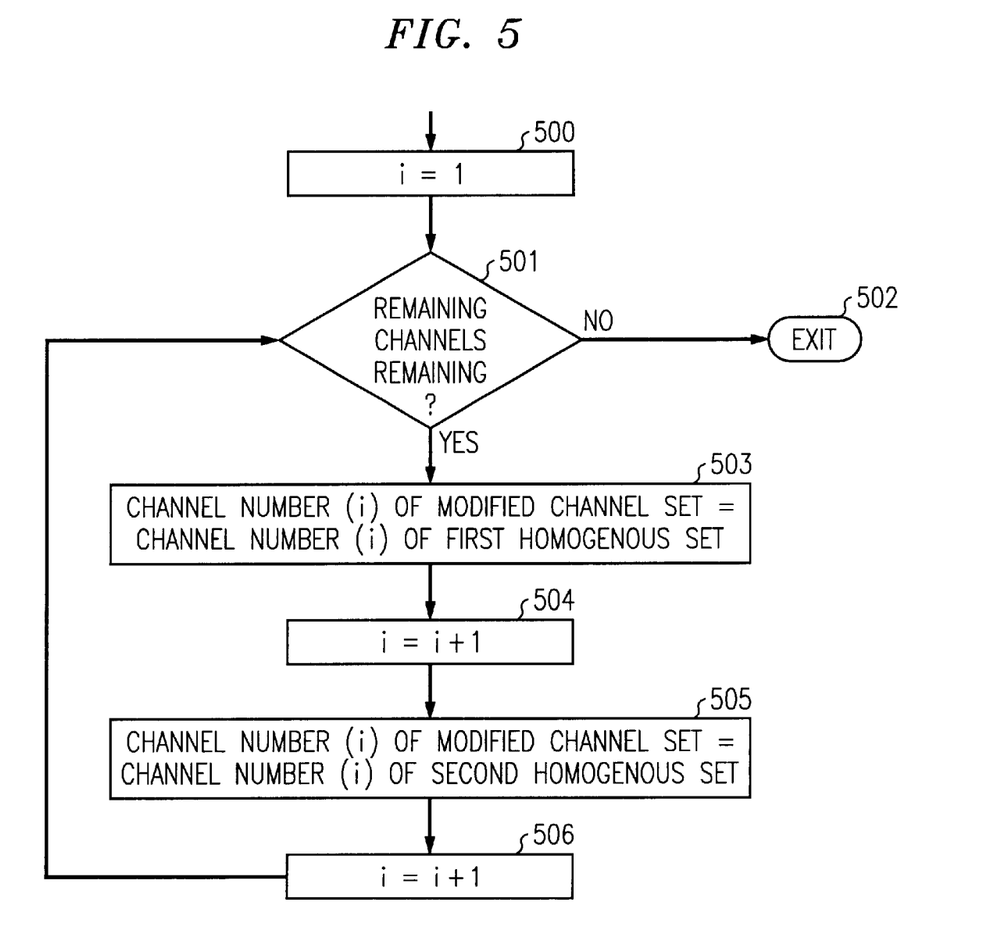
FIG. 5 illustrates a flow diagram of the zig-zag algorithm in order to construct a channel set that reduces IM products.

FIG. 5 illustrates a flow diagram of an alternative algorithm called the "zig-zag" algorithm. This algorithm can be used when there is an even number of homogeneous channel sets. This algorithm, combined with the logic shown in FIG. 3a, presents a second exemplary embodiment of the invention. The zig-zag algorithm is conceptually simpler than the modified zig-zag algorithm; however, the reduction of IM products is not as great as with the modified zig-zag algorithm. A modified channel set is constructed by processing two purely homogeneous channel sets with the zig-zag algorithm. Partitioning into groups is not required as with the modified zig-zag algorithm. As with the modified zig-zag algorithm, the purely homogeneous channel sets are ordered in progressively larger magnitude. The zig-zag algorithm selects channel numbers from first and second purely homogeneous channel sets by progressively incrementing index pointer i. In step 500, index pointer is set to 1, corresponding to the first channel number. If no channel numbers remain in step 501, the routine is exited in step 502. If a channel number remains in the purely homogeneous channel sets as determined by step 501, step 503 determines that the ith channel number of the modified channel set is equal to the ith channel number of the first purely homogeneous channel set. If step 503 is executed, index pointer i is incremented in step 504. In step 505, the ith channel number of the modified channel set is equal to the ith channel number of the second purely homogeneous channel set. Index pointer i is then incremented in step 506. Step 501 is repeated. Once the first modified channel set is constructed, a second modified channel is constructed by exchanging the roles of the first purely homogeneous channel and the second purely homogenous channel set in steps 503 and 505. The routine in FIG. 5 is executed a second time.

Figure 6:
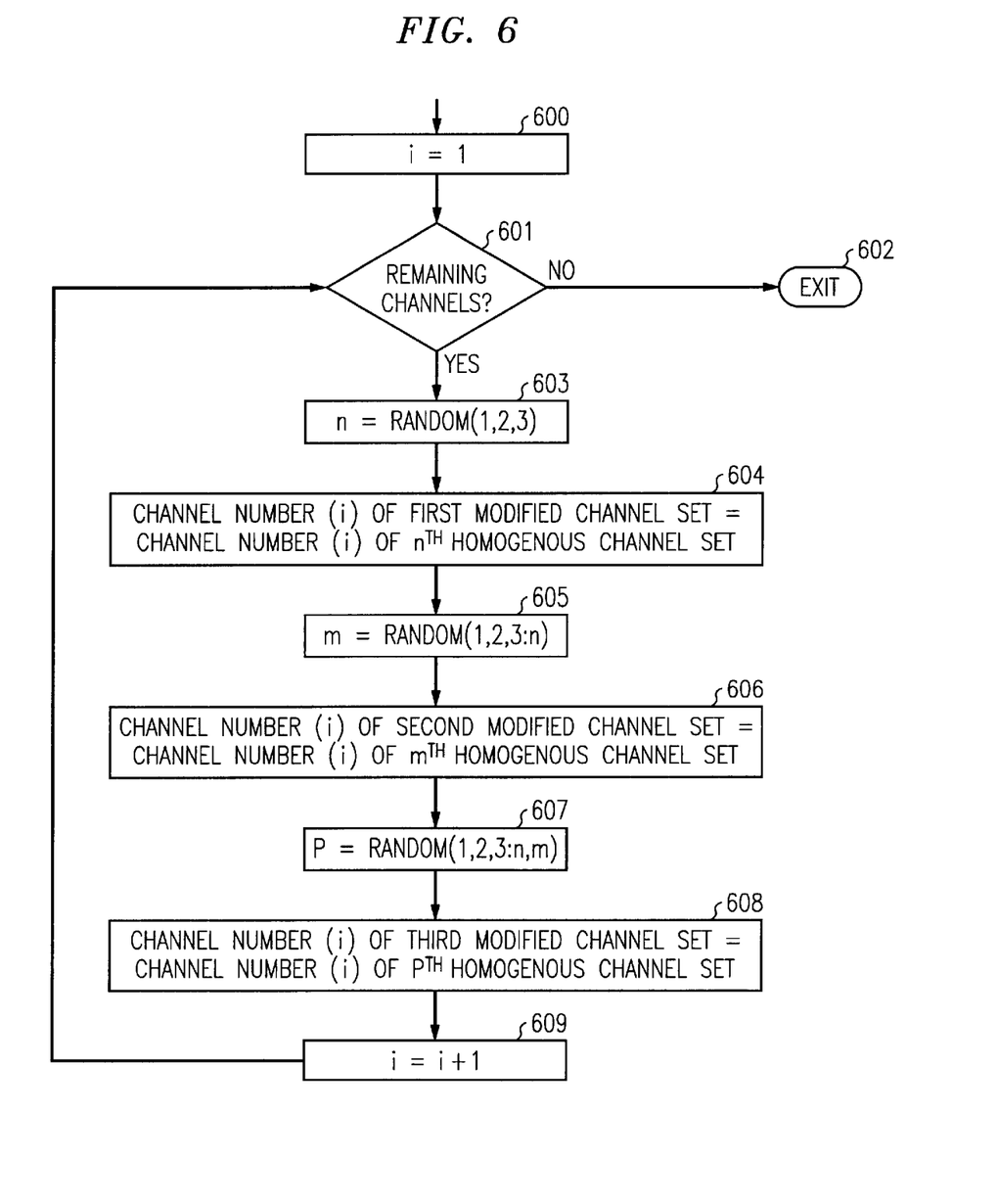
FIG. 6 illustrates a flow diagram of the randomized algorithm in order to construct a channel set that reduces IM products.

Both the modified zig-zag algorithm and the zig-zag algorithm are examples of deterministic approaches in constructing modified channel sets. Such approaches construct a modified channel set in a fixed fashion. FIG. 6 illustrates the "randomized" algorithm, which reduces the occurrence of IM products by reducing the degree of homogeneity of the modified channel sets as compared to that of purely homogeneous channel sets. This algorithm, in conjunction with the logic shown in FIG. 3a, presents a third exemplary embodiment of the invention. In FIG. 6, three modified channel sets are constructed from three purely homogeneous channel sets. The randomized algorithm selects channel numbers from first, second, and third purely homogeneous channel sets by progressively incrementing index pointer i. In step 600, index pointer is set to 1, corresponding to the first channel number. If step 601 determines that no channel numbers remain in the purely homogeneous channel sets, then the routine is exited in step 602. If a channel number remains in the homogeneous channel sets as determined by step 601, step 603 randomly chooses an integer n from 1, 2, and 3. In step 604, the ith channel number of the first modified channel set is equal to the ith channel number of the nth purely homogeneous channel set. In step 605, an integer m is randomly chosen from an integer not chosen in step 603. In the notation shown in step 605, the integer following the ":" indicates that the specified integer is not considered when randomly choosing an integer. In step 606, the ith channel number of the second modified channel set is equal to the ith channel number of the mth purely homogenous channel set. In step 607, an integer p is equal to the integer not chosen in steps 603 and 605. In step 608, the ith channel number of the third modified channel set is equal to the ith channel number of the pth purely homogeneous channel set. Index pointer i is incremented in step 609, and step 601 is then repeated. When this routine has completed, three modified channels have been constructed. In order to construct the next three modify channel sets, this routine is repeated with the next three homogeneous channel sets and so forth.

The quantitative assessment of third-order IM products heretofore includes only the effects of frequency pairs and not frequency triplets. However, the benefits of the present invention apply both to frequency triplets and to frequency pairs. Such benefits can be appreciated by one skilled in the art.

If a channel set contains a plurality of purely homogenous channel sets, such as the B frequency band of the 850 MHz cellular spectrum, the algorithms discussed heretofore can be applied separately to each purely homogeneous channel set.

Cellular radio service is currently applicable to several frequency spectra centered around 850 MHz and around 1.8 GHz and to different radio technologies such as Advanced Mobile Phone Service (AMPS), Time Division Multiple Access (TDMA), Groupe Special Mobile (GSM). One skilled in the art will recognize how to apply these algorithms to different radio spectra and radio technologies. Moreover, these algorithms are applicable to future allocated radio spectra in which the frequency reuse factor is greater than 1.

Other algorithms that reduce the degree of homogeneity can be devised by one skilled in the art. Moreover, the approaches described heretofore are applicable to the 850 MHz cellular frequency spectrum, the PCS frequency spectrum, the GSM frequency spectrum, ETACS/TACS frequency spectrum, the PDC frequency spectrum, and other frequency spectra that may be allocated in the future for cellular radio systems. Moreover, current art assigns channel numbers to channel sets strictly using purely homogeneous channel sets. Any deviation from this practice would fall under the claims of this invention.

It is to be understood that the above-described embodiment is merely an illustrative principle of the invention and that many variations may be devised by those skilled in the art without departing from the scope of the invention. It is, therefore, intended that such variations be included with the scope of the claims.

What is claimed:

1. A method for determining cellular radio channel assignments to minimize interference due to intermodulation products comprising the steps of:

choosing at least a first and second purely homogeneous channel set associated with a transmission site wherein each channel set contains channel numbers arranged in progressively larger amplitude order;

generating a table in which said at least first and second purely homogeneous channel sets define respective first and second columns with each column containing channel numbers arranged in progressively larger amplitude order; and constructing a modified channel set from channels contained in said first and second columns by selecting only one channel from each row of said table.

2. The method according to claim 1 wherein said choosing step comprises choosing first, second and third purely homogeneous channel sets, said generating step comprising generating a table with first, second and third respective columns, and said constructing step constructing a modified channel set based on said first, second and third columns by selecting only one channel from each row of said table and limiting the number of consecutive selections from a single column to less than three.

3. The method according to claim 1 further comprising the step of storing the constructed, modified channel set in which each stored channel is stored in order by the row from which it was selected to define channel assignments.

4. The method according to claim 3 further comprising the step of determining the channel number to be used based on the stored channel set, the determining step determining the channel number to be used based on the first stored channel that is available for use.

5. The method according to claim 2 further comprising the step of storing the constructed, modified channel set in which each stored channel is stored in order by the row from which it was selected to define channel assignments.

6. The method according to claim 5 further comprising the step of determining the channel number to be used based on the stored channel set, the determining step determining the channel number to be used based on the first stored channel that is available for use.

7. An apparatus that determines cellular radio channel assignments to minimize interference due to intermodulation products comprising:

means for choosing at least a first and second purely homogeneous channel set associated with a transmission site wherein each set contains channel numbers arranged in progressively larger amplitude order;

means for generating a table in which said at least first and second purely homogeneous channel sets define respective first and second columns with each column containing channel numbers arranged in progressively larger amplitude order; and means for constructing a modified channel set from channels contained in said first and second columns by selecting only one channel from each row of said table.

8. The apparatus according to claim 7 wherein said choosing means chooses first, second and third purely homogeneous channel sets, said generating means generates a table with first, second and third respective columns, and said constructing means constructs a modified channel set based on said first, second and third columns by selecting only one channel from each row of said table and limiting the number of consecutive selections from a single column to less than three.

9. The apparatus according to claim 7 further comprising means of storing the constructed, modified channel set in which each stored channel is stored in order by the row from which it was selected to define channel assignments.

10. The apparatus according to claim 9 further comprising means for determining the channel number to be used based on the first stored channel that is available for use.

11. The apparatus according to claim 8 further comprising means for storing the constructed, modified channel set in which each stored channel is stored in order by the row from which it was selected to define channel assignments.

12. The apparatus according to claim 11 further comprising means for determining the channel number to be used based on the stored channel set and the first stored channel that is available for use in the order stored.

* * * * *